United States Patent

Poggio et al.

(10) Patent No.: US 6,696,512 B2
(45) Date of Patent: Feb. 24, 2004

(54) AQUEOUS DISPERSIONS OF FLUOROPOLYMERS

(75) Inventors: Tiziana Poggio, Alessandria (IT); Enrico Marchese, Asti (IT)

(73) Assignee: Ausimont S.p.A., Milan (IT)

(*) Notice: Subject to any disclaimer, the term of this patent is extended or adjusted under 35 U.S.C. 154(b) by 0 days.

(21) Appl. No.: 10/046,883

(22) Filed: Jan. 17, 2002

(65) Prior Publication Data

US 2002/0132895 A1 Sep. 19, 2002

(30) Foreign Application Priority Data

Jan. 18, 2001  (IT) ..................... MI2001A0087

(51) Int. Cl.⁷ .............................. C08K 5/06
(52) U.S. Cl. ................. 524/376; 524/378; 524/220; 526/242; 526/250; 526/252; 428/421; 260/29.6 F
(58) Field of Search ................ 524/376, 378, 524/220; 526/250, 242, 252; 428/421; 260/29.6 F

(56) References Cited

U.S. PATENT DOCUMENTS

| | | | |
|---|---|---|---|
| 3,037,953 A | 6/1962 | Marks et al. | 260/29.6 |
| 3,301,807 A | 1/1967 | Honshi | 260/29.6 |
| 3,316,201 A | 4/1967 | Hahn et al. | 260/29.6 |
| 3,896,071 A | 7/1975 | Poirier | 260/29.6 |
| 3,900,684 A | 8/1975 | Edwards et al. | 428/421 |
| 3,925,292 A | 12/1975 | Holmes | 260/29.6 |
| 3,981,945 A | 9/1976 | Attwood et al. | 260/900 |
| 4,043,966 A | 8/1977 | Edwards et al. | 260/29.6 |
| 4,369,266 A | 1/1983 | Kuhls et al. | 523/332 |
| 4,789,717 A | 12/1988 | Giannetti et al. | 526/209 |
| 4,864,006 A | 9/1989 | Giannetti et al. | 526/209 |
| 4,883,716 A * | 11/1989 | Effenberger et al. | 428/421 |
| 5,219,910 A | 6/1993 | Stahl et al. | 524/236 |
| 5,374,453 A * | 12/1994 | Swei et al. | 427/226 |
| 5,478,651 A * | 12/1995 | Tannenbaum | 428/422 |
| 5,985,966 A | 11/1999 | Ogura et al. | 524/161 |
| 6,013,712 A * | 1/2000 | Chittofrati et al. | 524/366 |
| 6,153,688 A * | 11/2000 | Miura et al. | 524/546 |
| 6,498,207 B1 * | 12/2002 | Hoshikawa et al. | 524/378 |
| 2003/0158310 A1 * | 8/2003 | Asano et al. | 524/376 |

FOREIGN PATENT DOCUMENTS

| | | |
|---|---|---|
| EP | 0 818 506 B1 | 1/1998 |
| EP | 1 059 333 A1 | 12/2000 |
| GB | 642025 | 8/1950 |
| GB | 1 327 690 | 8/1973 |
| GB | 1 345 746 | 2/1974 |
| GB | 1 378 288 | 12/1974 |
| GB | 1 406 283 | 9/1975 |
| GB | 1 439 599 | 6/1976 |

* cited by examiner

*Primary Examiner*—David W. Wu
*Assistant Examiner*—Henry S. Hu
(74) *Attorney, Agent, or Firm*—Arent Fox Kintner Plotkin & Kahn

(57) ABSTRACT

Aqueous dispersions of fluoropolymers containing as stabilizer from 1 to 30% by weight with respect to the fluoropolymer, of a non ionic surfactant having the following structure:

$$CH_3(CH_2)_nO(C_3H_6O)_p(CH_2CH_2O)_mH \quad (I)$$

wherein:
n is in the range 8–20, preferably 12–15;
m is in the range 5–20, preferably 7–12;
p is in the range 1–8, preferably it is 1 or 2.

14 Claims, No Drawings

AQUEOUS DISPERSIONS OF FLUOROPOLYMERS

The present invention relates to aqueous dispersions of fluoropolymers usable for coating of metal and ceramic surfaces and in the impregnation of textiles, glass, carbon or aramid fibers.

Specifically, the present invention relates to aqueous dispersions of fluoropolymers having an improved stability to segregation, and a lower viscosity variation with the temperature, wherefore they are particularly suitable in the impregnation of textiles and in the obtainment on metal substrata of coatings having improved properties without colouring problems.

It is known that from the polymerization in emulsion aqueous dispersions of fluoropolymers having a dry polymer content generally not higher than 30–35% by weight are obtained. In polymerization a fluorinated ionic stabilizer is generally used, so as to avoid the polymer particle coagulation. To obtain dispersions having colloidal stability, it is necessary that the dry polymer amount is not higher than 30–35% by weight.

However, for coating of various types of substratum such as for example metals, ceramics, or for the impregnation of glass, carbon or aramid fibers, the use of dispersions of fluoropolymers having a higher dry polymer content is advantageous, in particular a dry polymer content equal to 60% by weight. Said dispersions having a high polymer content show the best application characteristics, i.e. a good balance between the deposit of a sufficient amount of material on the substratum, a lower amount of water to be evaporated during the drying phase, and a suitable viscosity of the dispersion in connection with the application technique and the manufactured article to be coated.

Therefore, the dispersions obtained from the polymerization are subjected to a concentration step in which they are stabilized by using suitable surfactants, generally non ionic. The use of said surfactants allows to prepare dispersions having a dry polymer content up to 70% by weight. For the dispersion concentration, various processes are known which comprise evaporation under vacuum (U.S. Pat. No. 3,316,201), electrodecantation (GB-A 642,025), ultrafiltration (U.S. Pat. No. 4,369,266). Alternatively, the reversible flocculation of the dispersion containing the non ionic surfactant is induced by heating over the cloud point temperature of the surfactant (U.S. Pat. No. 3,037,953).

The concentrated dispersion must have very good stability characteristics to segregation to avoid drawbacks during the various working steps (transport, storage, formulation, application) and to allow a sufficiently long shelf-life of the compound. It is known indeed that, due to the difference of density betwen fluoropolymers (density about 2 g/ml) and water (density 1 g/ml), segregation phenomena can easily occur and give rise to the formation of not redispersible aggregates (caking). This impairs the possibility to use concentrated dispersions. Besides, concentrated dispersion must have good wettability properties of the surfaces to be coated and a small variation of viscosity in the application temperature range, so as to allow a careful control of the coating process. In this way during the application of subsequent layers of fluoropolymer, defect formation problems like coagulum, cissing are avoided, which represent the main application limits of these dispersions, especially as regards high productivity application techniques such as impregnation, casting.

A method for stabilizing concentrated dispersions of fluoropolymers consists in the use of non ionic surfactants of the class of alkylphenols or polyethoxylated alcohols. For example U.S. Pat. No. 3,301,807 describes the concentration and stabilization of PTFE dispersions, by the use of surfactants of the class of polyethoxylated alkylphenols. The use of these stabilizers shows various drawbacks related first of all to the decomposition of the surfactant during the fluoropolymer sintering phase. The residues of the surfactant decomposition are indeed responsible of the colouring of the manufactured articles treated with the above concentrated PTFE dispersions. Besides, by using poly-ethoxylated alkylphenols as stabilizers, during the application of the dispersion, it may happen the formation of smokes containing harmful volatile substances.

In U.S. Pat. No. 5,985,966 an aqueous dispersion of fluoropolymers stabilized with a phenolic surfactant is described, whose hydrophilic part, besides the polyoxyethylene chain, contains an ionic group —$SO_3M$ (M=Na, K or $NH_4$). The so stabilized dispersion shows good shear stability which make it suitable to the use for the surface coating, also by multilayer deposition. However the dispersions described in this patent do not allow to obtain the required colour and transparency characteristics of the deposited film. In fact, the surfactant decomposition during the fluoropolymer sintering is responsible of the colouring of the coated manufactured articles.

In U.S. Pat. No. 5,219,910 the use of oxidized alkylamines as stabilizers for obtaining concentrated dispersions of fluoropolymers is reported, able to generate films of fluorinated material having improved colour properties and a lower content of organic residues after sintering. However, the concentrated dispersions containing oxidized alkylamines are characterized by an excessive formation of foam, which implies during the deposition process the formation of a dishomogeneous layer with presence of holes. Therefore with these dispersions, satisfactory quality coatings from the industrial point of view are not obtained.

EP 818,506 describes the use of ethoxylated alcohols as stabilizers of fluoropolymer dispersions. Said stabilizers contain from 65% to 70% by weight of ethylene oxide and have a cloud point in the range 45° C.–85° C. The colour and transparence properties of the obtained film result good. However, tests carried out by the Applicant (see the comparative Examples), have shown that the use of said stabilizers implies the obtainment of concentrated fluoropolymer dispersions having a limited stability to segregation and a meaningfully variation of viscosity with the temperature. High variations of the viscosity with the temperature give inconveniences during the dispersion deposition in the application step, since it is very difficult to obtain coatings having an homogeneous thickness. Besides a limited stability to segregation leads to obtain dispersions which cannot be stored for long time.

The need was therefore felt to have available aqueous concentrated dispersions of fluoropolymers able to overcome the above drawbacks of known dispersions of the prior art and having the following combination of properties:

- an improved stability to segregation, in particular a remarkably more reduced segregation rate with respect to the known prior art dispersions;
- a limited variation of the viscosity with the temperature, which means a better control of the dispersion deposition process for obtaining coatings having a homogeneous thickness;
- high white and transparence index of the deposited film.

An object of the present invention are therefore aqueous dispersions of fluoropolymers containing as stabilizer from 1 to 30% by weight, preferably from 2.5 to 7% by weight with respect to the fluoropolymer, of a non ionic surfactant having the following structure:

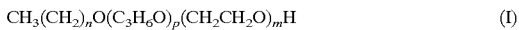

$$CH_3(CH_2)_nO(C_3H_6O)_p(CH_2CH_2O)_mH \qquad (I)$$

wherein n, m, p are integers, and
n is in the range 8–20, preferably 12–15;
m is in the range 5–20, preferably 7–12;
is in the range 1–8, preferably it is 1 or 2.

The aqueous dispersions of fluoropolymers of the present invention have a concentration of dry polymer in the range 10%–75% by weight, preferably 50–70% by weight, under the form of colloidal fluoropolymer particles; the average diameter of the fluoropolymer particles being in the range 5–300 nm.

The lower concentration limit of the stabilizer is represented by 1% by weight based on the polymer. It has been found by the Applicant that for concentrations under said limit, the dispersion results to be not very stable mechanically. At concentrations higher than 30% by weight based on the polymer, the dispersion viscosity becomes too high for coating applications. It is preferred to use a stabilizer concentration in the range 2.5–7% by weight, and in any case such to guarantee the complete covering of the polymer particle surface in connection with their diameter.

The fluoropolymers used in the present invention are selected from:

1) homopolymers of tetrafluoroethylene (TFE), or its copolymers with one or more monomers containing at least one unsaturation of ethylene type in an amount from 0 up to 3% by moles, preferably from 0.01 to 1% by moles;

2) thermoplastic copolymers of TFE with one or more monomers containing at least one unsaturation of ethylene type;

3) homopolymers of chlorotrifluoroethylene (CTFE), or its thermoplastic copolymers with one or more monomers containing at least one unsaturation of ethylene type;

4) homopolymers of vinylidene fluoride (VDF), or its thermoplastic copolymers with one or more monomers containing at least one unsaturation of ethylene type.

The comonomers having ethylene unsaturation which can be used are both of hydrogenated and fluorinated type.

Among the hydrogenated comonomers we can mention: ethylene, propylene, acrylic monomers, for example methylmethacrylate, (meth)acrylic acid, butylacrylate, hydroxyethylhexylacrylate, styrene monomers, such as for example styrene.

Among the fluorinated comonomers we can mention:
$C_3$–$C_8$ perfluoroolefins, such as hexafluoropropene (HFP);
$C_2$–$C_8$ hydrogenated fluoroolefins, such as vinyl fluoride (VF), vinylidene fluoride (VDF), trifluoroethylene, hexafluoroisobutene, perfluoroalkylethylene $CH_2=CH$—$R_f$, wherein $R_f$ is a $C_1$–$C_6$ perfluoroalkyl;
$C_2$–$C_8$ chloro- and/or bromo- and/or iodo-fluoroolefins, such as chlorotrifluoroethylene (CTFE);
$CF_2=CFOR_f$ (per)fluoroalkylvinylethers (PAVE), wherein $R_f$ is a $C_1$–$C_6$ (per)fluoroalkyl, for example $CF_3$, $C_2F_5$, $C_3F_7$;
$CF_2=CFOX$ (per)fluoro-oxyalkylvinylethers, wherein X is: a $C_1$–$C_{12}$ alkyl, or a $C_1$–$C_{12}$ oxyalkyl, or a $C_1$–$C_{12}$ (per)fluorooxyalkyl having one or more ether groups, for example perfluoro-2-propoxy-propyl; fluorodioxoles, preferably perfluorodioxoles.

The TFE thermoplastic copolymers are preferably:
TFE copolymers containing from 7 to 27% by weight of hexafluoropropene;
copolymers containing from 0.5 to 18% by weight, in particular from 2 to 10% by weight of one or more perfluoroalkylvinylethers and/or fluorinated dioxoles, preferably selected from methyl-, ethyl-, propylvinylether, 2,2,4-trifluoro-5-trifluoromethoxy-1,3-dioxole (TDD), perfluoro-2,2-dimethyl-1,3-dioxole (PDD).

The dispersion of the present invention can be obtained starting from the polymerization latex by addition of the non ionic surfactant having structure (I). To obtain a concentrated dispersion, after the addition of the stabilizer, the dispersion concentration can be carried out. Concerning this, one of the following techniques can be used: evaporation under vacuum, electrodecantation, ultrfiltration.

As regards the polymerization of fluoropolymers, it can be carried out in aqueous emulsion according to methods well known in the prior art, in the presence of radical initiators, both of inorganic type (alkaline or ammonium persulphates, perphosphates, perborates or percarbonates), and of organic type (peroxydisuccinic acid), optionally in combination with ferrous, cupric or silver salts, or of other easily oxidizable metals. In the rection medium fluorinatd ionic surfactants of formula:

$$R_f-X^-M^+$$

are present, wherein $R_f$ is a $C_5$–$C_{16}$ (per)fluoroalkyl chain or a (per)fluoropolyoxyalkylene chain, $X_-$ is —COO or —$SO_3^-$, $M^+$ is selected from: $H^+$, $NH_4^+$, an alkaline metal ion. Among the most commonly used we remember: ammonium perfluorooctanoate, (per)fluoropolyoxyalkylenes ended with one or more carboxylic groups, etc.

Alternatively, the polymerization is carried out in the presence of a microemulsion of perfluoropolyoxyalkylenes, according to U.S. Pat. No. 4,789,717 and U.S. Pat. No. 4,864,006.

The polymerization reaction is generally carried out at temperatures in the range 25°–150° C., under a pressure up to 10 MPa.

Without to be bound to any theory, the Applicant keeps that the particular structure of the surfactant of the invention increases the stabilizing power of the dispersion, and in particular, that by increasing the hydrated radius of the colloidal polymer particles, the segregation rate decreases. Besides, the particular structure of the surfactant of the invention positively affects the rheological behaviour of the concentrated dispersion, since the viscosity shows a limited variation in function of the temperature in the range 20°–40° C., commonly used for coating applications.

The concentrated dispersion of fluoropolymers of the present invention shows an improved stability to segregation, since it shows a segregation rate lower than about 50% (see the Examples) with respect to a dispersion stabilized with polyethoxylated octylphenol (commercially known as TRITON® X100) used in the preparation of the PTFE-based dispersions. Besides, the dispersion of the invention is characterized by a limited viscosity variation with the temperature, wherefore it is particularly suitable to be used for obtaining homogeneous without defect coatings on substrata of various nature, even by the multilayer deposition of fluoropolymers. Besides the stabilizers of the invention do not give colouring problems.

The dispersion of fluoropolymers of the present invention can be used as such or in specific formulations for the coating of metal, ceramic supports or in the impregnation of fibers and textiles of various materials. As regards the deposition, dipping, casting techniques, roll, film, or spraying application can be used.

The dispersion of the present invention can optionally contain the following components in the amounts known in the prior art:

water, organic solvents, such as for example, ethyl or isopropyl alcohol;
adhesion promoters, dyes, pigments;
metal oxides for improving the coating mechanical properties;
salts, for example potassium chlorate having the purpose to improve the dispersion filmability, Further fragrance substances, e.g. pinene derivatives, e.g. β-pinene polyethoxylated can be added to confer a pleasant smell. The amount of fragrance substances is e.g. in the range based on PTFE+water of the dispersion, 0,05–5% by wt.

Besides, to improve the wetting capability of the dispersion of the invention the following components can be optionally added, in an amount preferably in the range 500–3,000 ppm with respect to the total dispersion (water+fluoropolymer):
anionic, preferably fluorinated, surfactants such for example ammonium perfluorooctanoate, compounds of structure F—$(CF_2$—$CF_2)_n$—$CH_2$—$CH_2$—$SO_3M$ (FORAFAC® 1033D), $ClC_3F_6O(C_3F_6O)_n$—$CF_2COONH_4$ (FLUOROLINK® 7004);
fluorinated non ionic surfactants, such for example the compounds of structure $CF_3(CF_2)_5$—$(CH_2CH_2O)_8H$ (Forafac ® 1110D), $C_3F_6Cl$—O—$(CF_2CF(CF_3)O)_m$ $(CF_2O)_n$—$CF_2$—CONH—$(CH_2CH_2O)_{21}CH_2CH_2OCH_3$ (Fluorolink 7005®).

The dispersions of the invention show very good properties of stability to segregation and application characteristics such as to allow the application of subsequent layers of fluoropolymer, even with high productivity techniques, such as impregnation, casting and dipping, without the appearance of defects such as cissings, coagula or foam.

The present invention will now be better illustrated by the following embodyment Examples, which have a merely indicative but not limitative purpose for the scope of the invention itself.

EXAMPLES

Characterization

The determination of the stability to segregation is parallely carried out in three graduated cylinders having a 100 ml capacity, which are filled with the concentrated dispersion, and kept at a constant temperature, respectively of 20°, 300° and 40° C. The dispersion stability is evaluated by the measurement, in function of the time, of the heigth of the transparent supernatant layer formed at the top of the cylinders by segregation of the fluoropolymer particles. The movement of the separation front represents the segregation rate which is expressed in mm/hour.

The viscosity measurements have been carried out at 50 rpm with a Brookfield viscometer model DV-II, using 350 ml of dispersion contained in a 400 ml glass beaker, using the rotor No. 1 (reversed cup). The viscosity measurements have been carried out in a thermostatic bath at 20°, 30° and 40° C. using dispersions formulated with 1,500 ppm of ammonium salt of the perfluorooctanoic acid, so as to amplify the variation of the viscosity with the temperature.

The colour characteristics of the sintered film are evaluated by the visual comparison both of transparent films, and by the application of films on a black ground to more put in evidence the yellowing effects. In the former case the dispersion is applied by casting on an aluminum plate maintained at a constant inclination of 45° with respect to the horizontal plane, so as to obtain a thickness gradient from 0 to 10 μm for 18 cm of length. After drying at room temperature, the deposited film is sintered at 400° C. for 10 minutes.

The evaluation on black ground is carried out by using the concentrate dispersion in the preparation of an acrylic formulation, adding the following components: 5% by weight based on the acrylic resin polymer Rhodopas D906, 0.8% by weight of sodium salt of lauryl acid, 2% by weight of xylene, 2% by weight of butylcellosolve.

The obtained formulation is applied by air-spraying on an aluminum plate previously treated with a black ground based on polyaminoimidic resins, so as to obtain a thickness of about 30 μm. After drying at room temperature, the deposited film is sintered at 400° C. for 10 minutes.

On the sintered film the critical thickness is determined by optical microscopy. By critical thickness it is meant the maximum thickness obtainable without cracks and surface defects inside the film.

The concentrated dispersion is used in impregnation tests of a glass material on vertical tower. The glass material is totally dipped in a bath containing the concentrated dispersion at a dragging speed equal to 1.2 m/min. The dispersion excess is removed by passing the material between two squeezing rolls. Subsequently the impregnated material is dried at 120° C. and sintered at 350° C. for a time of about 30 seconds. The impregnation process and subsequent sintering is repeated 6 times to have a deposition of about 150 grams of PTFE for $m^2$ of material.

Then the coating gloss is evaluated according to the ASTM D523 method, while the integrity and the colour of the coating are evaluated by the above methods.

Example 1

PTFE Polymerization 11 grams of an aqueous solution of ammonium perfluorooctanoate and 31 liters of carefully degassed demineralized water are fed into a 50 liter autoclave equipped with mechanical stirrer and previously put under vacuum. Also 140 grams of paraffin with melting point in the range 52° C.–54° C. were previously introduced in the reactor. The autoclave is kept under mechanical stirring and pressurized with TFE, up to a pressure of 20 bar, at a temperature of 66° C. At this point 500 cc of solution of $(NH_4)_2S_2O_8$ (APS) and disuccinic peroxide (DSAP), corresponding to 125 mg of APS and 2500 mg of DSAP are fed as initiators.

When the reactor pressure has decreased of 0.5 bar, one starts to fed TFE by a compressor so as to maintain the pressure constant at 20 bar inside the reactor. In the meantime the internal temperature of the reactor is increased up to 80° C. at a rate equal to 0.5° C./min. During the reaction 50.5 grams of the aqueous solution at 100 grams/liter of ammonium perfluorooctanoate are fed to the autoclave. After 97 minutes, when 15,800 grams of TFE have reacted, the monomer feeding is stopped and the reactor is evacuated and cooled. The discharged latex has a concentration of 540 grams of PTFE for liter of water, corresponding to a concentration of dry polymer equal to 30% by wt. The diameter of the polymer primary particles, measured by Laser Light Scattering (LLS) is equal to 245 nm.

The obtained PTFE dispersion, containing 30% by weight of dry polymer, is then added with an amount equal to 4% by weight with respect to the polymer of a non ionic surfactant of structure:

with n=12, m=10, p=1,
commercialized with the name ANTAROX® 863

Then the dispersion is concentrated by ultrafiltration with PVDF 200 Kdalton tubular membranes (Koch Membrane System), until obtaining a concentration of 63% by weight of dry polymer.

The content of non ionic surfactant is brought to 5% by weight based on the PTFE, by adding non ionic surfactant ANTA-ROX® 863. The final dispersion results to have a concentration equal to 60% by weight of dry polymer.

Stability to Segregation

The concentrated dispersion of the invention is carefully homogeneized and subjected to the evaluation test of the segregation stability at 20°, 30° and 40° C. From the data of Table 1 it results evident that the dispersion of the present invention shows a very low segregation rate in the whole temperature range considered. Therefore, the concentrated dispersion of the present invention shows a high stability to segregation in the whole temperature range of interest for the storage, transport and processing of the fluoropolymer dispersions.

Thermal Stability

The dispersion of the present invention is added with 1,500 ppm of ammonium salt of the perfluorooctanoic acid and subjected to the thermal stability test, by Brookfield viscosity measurements, according to the described procedures. As shown in Table 1, the concentrated and stabilized dispersion of the invention shows a limited increase of viscosity in the temperature range between 20° C. and 40° C.

Filmability

The concentrated dispersion of the invention is formulated with 900 ppm of potassium chlorate and applied by casting on an aluminum plate according to the above methods. The sintered film is examined by the optical microscope (20×) to check the presence of defects: any crack is noticed till to the plate bottom, wherefore the crack critical thickness is higher than 10 μm, as shown in Table 2.

Film Colouration

The colour properties of the obtained film have been evaluated, both in the case of casted plates as above described, and on films obtained by spray application from dispersions formulated with acrylic resin. In both cases, the concentrated dispersion of the present invention allows to obtain light films, without yellowing phenomena, as shown in Table 2.

Impregnation Tests

Impregnation tests are carried out on vertical tower of a glass material, using the above described process. The use of the concentrated dispersion of the present invention allows to obtain the deposit of subsequent polytetrafluoroethylene layers without making evident cissing problems or the appearance of other defects due to the poor wettability power. Table 3 shows that, the deposited product being the same, there are no yellowing phenomena of the coating.

Example 2 (Comparative)

The same dispersion of polytetrafluoroethylene, obtained according to the polymerization procedure described in Example 1 and having a content of dry polymer equal to 30% by weight, is added with an amount equal to 4% based on the dry polymer of a non ionic surfactant of structure:

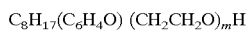

with m=9–10,
commercialized with the name TRITON® X100.

The dispersion is then concentrated according to the same procedures used in Example 1, until obtaining a concentration of 64.3% by weight of dry polymer.

The content of non ionic surfactant is brought to 5% based on the PTFE by adding TRITON® X100. The final dispersion results to have a concentration equal to 60% by weight of dry polymer.

Stability to Segregation

The concentrated dispersion is carefully homogeneized and subjected to the evaluation test of the segregation stability at 20°, 30° and 40° C. From the data of Table 1 it results evident that the obtained dispersion shows segregation rate values cleary higher than those of Example 1 in the whole temperature range considered. Consequently, it results less stable to segregation than the concentrated dispersions of the present invention.

Thermal Stability

The concentrated dispersion is added with 1,500 ppm of ammonium salt of the perfluorooctanoic acid and subjected to the thermal stability test, by Brookfield viscosity measurements, according to the described procedures. The dispersion shows a significant increase of viscosity in the temperature range between 20° C. and 40° C.

Filmability

The obtained dispersion is formulated as in Example 1 with 900 ppm of potassium chlorate and applied by casting on aluminum. The sintered film results free from defects till to the plate bottom (critical thickness >10 μm, as shown in Table 2.

Film Colouration

The colour properties of the obtained film have been evaluated, both in the case of casted plates and on films obtained by spray application from dispersions formulated with acrylic resin. In both cases, the obtained film shows yellowing phenomena, due to the residues of decomposition of the aromatic ring present in the non ionic surfactant used as stabilizer. The results are shown in Table 2.

Impregnation Tests

Impregnation tests are carried out on vertical tower of a glass material, using the above process. The use of this concentrated dispersion allows to obtain the deposit of subsequent polytetrafluoroethylene layers without making evident cissing problems or the appearance of other defects due to the poor wettability power. However, Table 3 shows that, the deposited product being the same, yellowing phenomena of the coating occur.

Example 3 (Comparative)

The dispersion of polytetrafluoroethylene, obtained according to the polymerization procedure described in Exaample 1 is added with 5% based on the dry polymer of a non ionic surfactant of structure:

with m=8–9,
commercialized with the name RHODASURF® 870.

The dispersion is then concentrated according to the same procedures used in Example 1, until obtaining a concentration of 62.7% by weight of dry polymer.

The content of non ionic surfactant is brought to 5% based on the PTFE by addidng RHODASURF® 870. The final dispersion results to have a concentration equal to 60% by weight of dry polymer.

Stability to Segregation

The concentrated dispersion is carefully homogeneized and subjected to the evaluation test of the segregation stability at 20°, 30° and 40° C. From the data of Table 1 it results evident that the obtained dispersion shows segregation rate values cleary higher than those of Example 1 in the whole temperature range considered. Consequently, it results less stable to segregation than the concentrated dispersions of the present invention.

Thermal Stability

The concentrated dispersion is added with 1,500 ppm of ammonium salt of the perfluorooctanoic acid and subjected to the thermal stability test, by Brookfield viscosity measurements, according to the described procedures. The dispersion shows a significant increase of viscosity in the temperature range between 20° C. and 40° C.

Filmability

The obtained dispersion is formulated as in Example 1 with 900 ppm of potassium chlorate and applied by casting on aluminum. As shown in Table 2, the sintered film shows the presence of cracks at a thichness higher than 8 μm (critical thickness equal to 8 μm).

Film Colouration

The colour properties of the obtained film have been evaluated, both in the case of casted plates and on films obtained by spray application from dispersions formulated with acrylic resin. In both cases, the concentrated dispersion allows to obtain light films, without yellowing phenomena. The results are shown in Table 2.

Example 4
Polymerization PTFE Modified with PPVE 11 grams of an aqueous solution of ammonium perfluorooctanoate and 31 liters of carefully degassed demineralized water are fed into a 50 liter autoclave equipped with mechanical stirrer and previously put under vacuum. Also 140 grams of paraffin with melting point in the range 52° C.–54° C. were previously introduced in the reactor. The autoclave is kept under mechanical stirring and pressurized with TFE, up to a pressure of 20 bar, at a temperature of 66° C. At this point 500 cc of solution of $(NH_4)_2S_2O_8$ (APS) and disuccinic peroxide (DSAP), corresponding to 125 mg of APS and 2500 mg of DSAP are fed as initiators.

When the reactor pressure has decreased of 0.5 bar, one starts to feed TFE by a compressor so as to maintain the pressure constant at 20 bar inside the reactor. In the meantime the internal temperature of the reactor is increased up to 80° C. at a rate equal to 0.5° C./min. During the reaction 50.5 grams of the aqueous solution at 100 grams/liter of ammonium perfluorooctanoate are fed to the autoclave. When 14,220 grams of TFE have reacted, 25 grams of perfluoropropylvinylether (PPVE) are fed to the autoclave. After 120 minutes the TFE feeding is stopped and the reactor is evacuated and cooled. The discharged latex has a concentration of 530 grams of modified PTFE for liter of water, corresponding to a concentration of dry polymer equal to 30%. The diameter of the polymer primary particles, measured by Laser Light Scattering (LLS) is equal to 240 nm.

The obtained modified PTFE dispersion, containing 30% by weight of dry polymer, is then added with an amount equal to 4% by weight with respect to the polymer of a non ionic surfactant of structure:

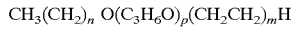

$$CH_3(CH_2)_n\ O(C_3H_6O)_p(CH_2CH_2)_mH$$

with n=12, m=10, p=1,
commercialized with the name ANTAROX® 863

Then the dispersion is concentrated by ultrafiltration with PVDF 200 Kdalton tubular membranes (Koch Membrane System), until obtaining a concentration of 63.3% by weight of dry polymer.

The content of non ionic surfactant is brought to 5% by weight based on the PTFE by adding ANTAROX® 863. The final dispersion results to have a concentration equal to 60% by weight of dry polymer.

Stability to Segregation

The concentrated dispersion of the invention is carefully homogeneized and subjected to the evaluation test of the stability to segregation at 20°, 30° and 40° C. From the data of Table 1 it result evident that the dispersion of the present invention shows a very low segregation rate in the whole temperature range considered. Therefore, the concentrated dispersion of the present invention shows a high stability to segregation in the whole temperature range of interest for the storage, transport and processing of the fluoropolymer dispersions.

Thermal Stability

The dispersion of the present invention is added with 1,500 ppm of ammonium salt of the perfluorooctanoic acid and subjected to the thermal stability test, by Brookfield viscosity measurements, according to the described procedures. As shown in Table 1, the concentrated and stabilized dispersion of the invention shows a limited increase of viscosity in the temperature range between 20° C. and 40° C.

Filmability

The concentrated dispersion of the invention is formulated with 900 ppm of potassium chlorate and applied by casting on an aluminum plate according to the above methods. The sintered film is examined by the optical microscope (20×) to check the presence of defects: any crack is noticed toll to the plate bottom, wherefore the crack critical thickness is higher than 10 μm, as shown in Table 2.

Film Colouration

The colour properties of the obtained film have been evaluated, both in the case of casted plates as above described, and on films obtained by application from dispersions formulated with acrylic resin. In both cases, the concentrated dispersion of the present invention allows to obtain light films, without yellowing phenomena, as shown in Table 2.

Impregnation Tests

Impregnation tests are carried out on vertical tower of a glass material, using the above described process. The use of the concentrated dispersion of the present invention allows to obtain the deposit of subsequent layers of modified PTFE without making evident cissing problems or the appearance of other defects due to the poor wettability power. Table 3 shows that, the deposited product being the same, there are no coating yellowing phenomena.

Example 5

The polytetrafluoroethylene dispersion is the same as obtained in Ex. 1 after ultrafiltration (dry polymer content of 63% by weight).

To this dispersion a second non-ionic surfactant having the structure of a polyethoxylated β-pinene, commercially known as NOPOL® 365 in an amount of 1% by wt. based on the PTFE has been added.

Then the amount of total surfactant in the dispersion is brought to 5% by wt. based on PTFE by adding ANTAROX® 863. The final dispersion has a PTFE of 60% by wt. (dry polymer). The same characterization tests of Example 1 have been performed. The results are reported in Tables 1, 2, 3, respectively.

TABLE 1

|  |  | Ex. 1 | Ex. 2 (comp.) | Ex. 3 (comp.) | Ex. 4 | Ex. 5 |
|---|---|---|---|---|---|---|
| SEGRE- | 20° C. | 0.011 | 0.032 | 0.022 | 0.014 | 0.015 |
| GATION | 30° C. | 0.016 | 0.028 | 0.028 | 0.021 | 0.02 |

TABLE 1-continued

|  |  | Ex. 1 | Ex. 2 (comp.) | Ex. 3 (comp.) | Ex. 4 | Ex. 5 |
|---|---|---|---|---|---|---|
| RATE (mm/hour) | 40° C. | 0.043 | 0.073 | 0.059 | 0.041 | 0.045 |
| VISCOSITY (cP) | 20° C. | 21 | 17 | 18 | 20 | 25 |
|  | 30° C. | 28 | 186 | 120 | 32 | 25 |
|  | 40° C. | 64 | 240 | 210 | 58 | 95 |

TABLE 2

|  |  | Ex. 1 | Ex. 2 (comp) | Ex. 3 (comp) | Ex. 4 | Ex. 5 |
|---|---|---|---|---|---|---|
| FILMABILITY (Critical thickness) | +0.09% KClO$_3$ | >10 μm | >10 μm | 8 μm | >10 μm | >10 μm |
|  | Acrylic formulation | 20 μm | 20 μm | 20 μm | 20 μm | 20 μm |
| COLOUR | +0.09% KClO$_3$ | light | yellow | light | light | light |
|  | Acrylic formulation | light | yellow | light | light | light |

TABLE 3

| IMPREGNATION TESTS | Example 1 | Ex. 2 (comp.) | Example 4 | Example 5 |
|---|---|---|---|---|
| deposit (g/m$^2$) | 152 | 158 | 156 | 154 |
| cracks | absent | absent | absent | absent |
| gloss | 31 | 30 | 26 | 26 |
| colour | light | yellowed | light | light |

What is claimed is:

1. Aqueous dispersions of fluoropolymers containing as stabilizer from 1 to 30% by weight, with respect to the fluoropolymer, of a non ionic surfactant having the following structure:

$$CH_3(CH_2)_nO(C_3H_6O)_p(CH_2CH_2O)_mH \quad (I)$$

wherein:
n is in the range 8–20;
m is in the range 5–20;
p is in the range 1–8.

2. Aqueous dispersions of fluoropolymers according to claim 1, have a concentration of dry polymer in the range 10%–75% by weight.

3. Aqueous dispersion according to claim 2, wherein the concentration of dry polymer is in the range 50–70% by weight.

4. Aqueous dispersions of fluoropolymers according to claim 1, wherein the average diameter of the fluoropolymer particles is in the range 5–300 nm.

5. Aqueous dispersions of fluoropolymers according to claim 1, wherein the fluoropolymers are selected from the group consisting of:
1) homopolymers of tetrafluoroethylene (TFE), or its copolymers with one or more monomers containing at least one ethylene unsaturation in an amount from 0 up to 3% by moles;
2) thermoplastic copolymers of TFE with one or more monomers containing at least one ethylene unsaturation;
3) homopolymers of chlorotrifluoroethylene (CTFE), or its thermoplastic copolymers with one or more monomers containing at least one ethylene unsaturation;
4) homopolymers of vinylidene fluoride (VDF), or its thermoplastic copolymers with one or more monomers containing at least one ethylene unsaturation.

6. Aqueous dispersions of fluoropolymers according to claim 5, wherein the TFE thermoplastic copolymers are selected from the group consisting of:
TFE copolymers containing from 7 to 27% by weight of hexafluoropropene;
copolymers containing from 0.5 to 18% by weight of one or more perfluoroalkylvinylethers and/or fluorinated dioxoles.

7. Aqueous dispersions of fluoropolymers according to claim 1, wherein the comonomers having ethylene unsaturation are hydrogenated or fluorinated.

8. Aqueous dispersions of fluoropolymers according to claim 7, wherein the hydrogenated comonomers are selected from the group consisting of: ethylene, propylene and acrylic monomers.

9. Aqueous dispersions of fluoropolymers according to claim 7, wherein the fluorinated comonomers are selected from the group consisting of:
C$_3$–C$_8$ perfluoroolefins; —C$_2$–C$_8$ hydrogenated fluoroolefins;
C$_2$–C$_8$ chloro- and/or bromo- and/or iodo-fluoroolefins;
CF$_2$=CFOR$_f$ (per)fluoroalkylvinylethers (PAVE), wherein R$_f$ is a C$_1$–C$_6$ (per)fluoroalkyl;
CF$_2$=CFOX (per)fluoro-oxyalkylvinylethers, wherein X is: a C$_1$–C$_{12}$ alkyl, or a C$_1$–C$_{12}$ oxyalkyl, or a C$_1$–C$_{12}$ (per)fluorooxyalkyl having one or more ether groups.

10. Aqueous dispersions of fluoropolymers according to claim 1, obtained by addition of the non ionic surfactant having structure (I) to the polymerization latex, optionally subsequent concentration of the dispersion.

11. Aqueous dispersions of fluoropolymers according to claim 1, containing the following components:
organic solvents;
adhesion promoters, dyes, pigments;
metal oxides;
salts.

12. Aqueous dispersions of fluoropolymers according to claim 1, comprising furthermore, in an amount in the range 500–3,000 ppm by weight with respect to the total dispersion (water+fluoropolymer), the following components:
anionic surfactants selected from the group consisting of fluorinated compounds of structure F—(CF$_2$—CF$_2$)$_n$—CH$_2$—CH$_2$—SO$_3$M, or ClC$_3$F$_6$O(C$_3$F$_6$O)$_n$—CF$_2$COONH$_4$;
fluorinated non ionic surfactants of structure CF$_3$(CF$_2$)$_5$—(CH$_2$CH$_2$O)$_8$H and C$_3$F$_6$Cl—O—

$(CF_2CF(CF_3)O)_m(CF_2O)_n-CF_2-CONH-(CH_2CH_2O)_{21}CH_2CH_2OCH_3$.

13. A method of coating metal, ceramic supports or impregnating fibers and textiles comprising applying the aqueous dispersions of fluoropolymers according to claim 1 to the metal, ceramic supports, fibers or textiles.

14. Aqueous dispersions according to claim 1, wherein the stabilizer is from 2.5 to 7% by weight and n is the range of 12–15, m is in the range of 7–12, and p is 1 or 2.

* * * * *